No. 787,510. PATENTED APR. 18, 1905.
E. G. HERBERT.
CIRCULAR SAWING MACHINE.
APPLICATION FILED APR. 18, 1903.
3 SHEETS—SHEET 1.
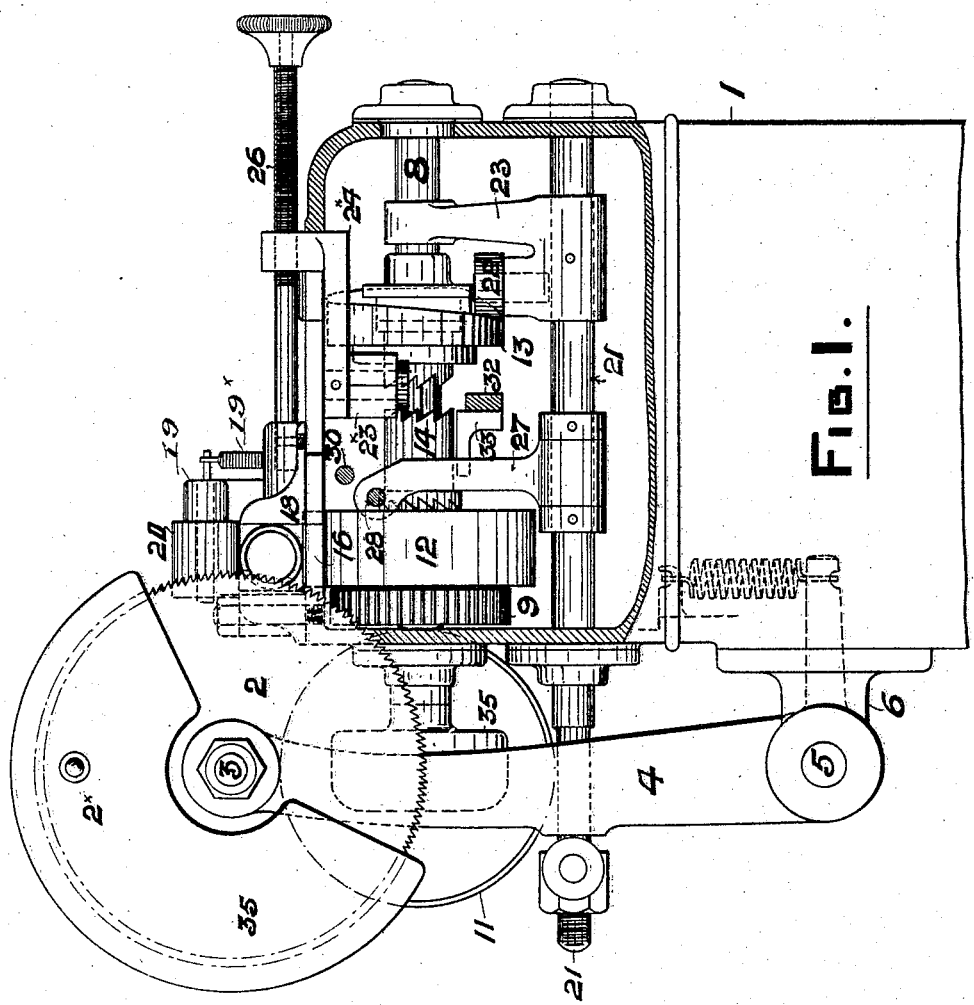
Witnesses:-
William Eastwood
John Camp
INVENTOR:
Edward G. Herbert
Walter Gunn
By his Attorney:

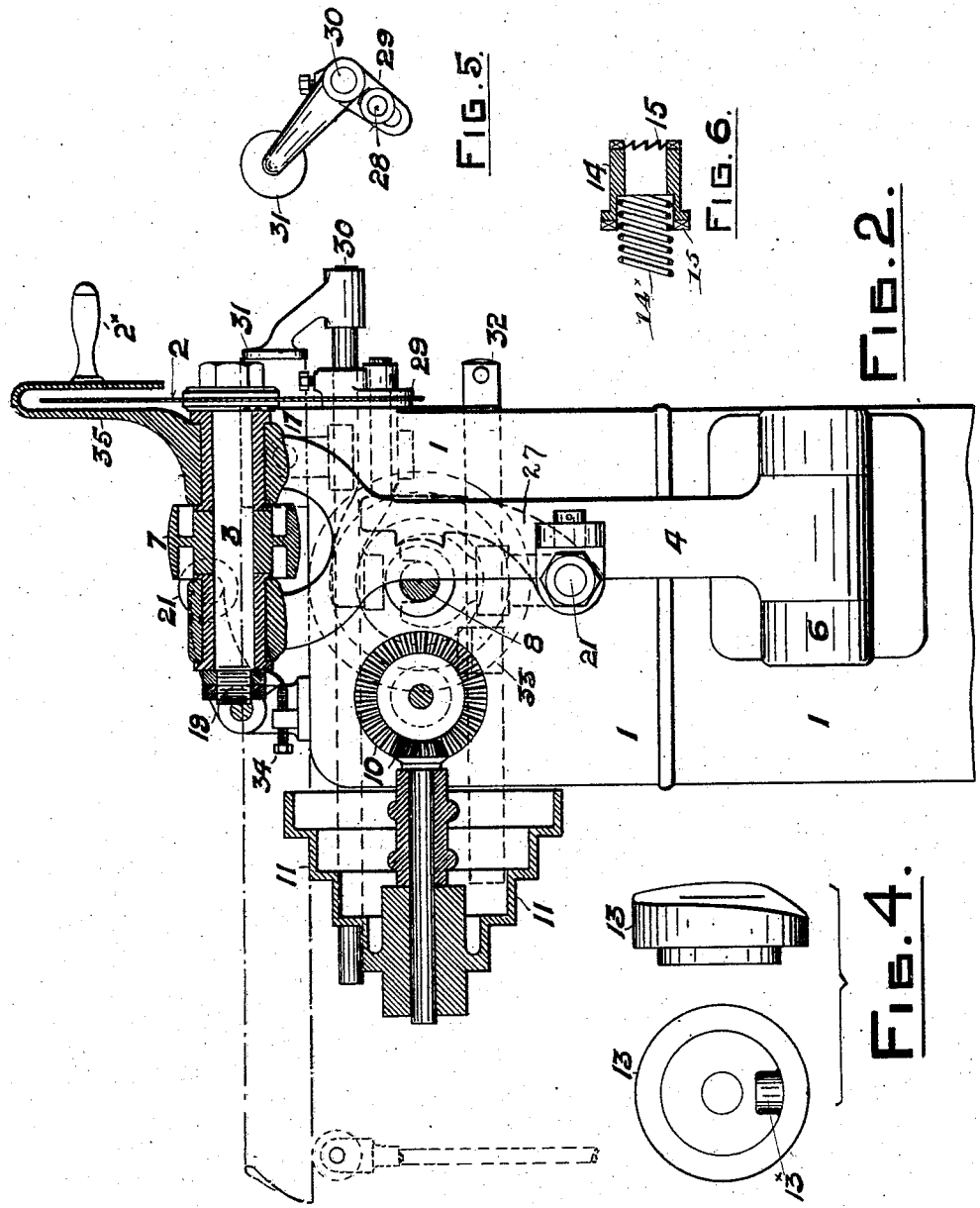

No. 787,510. PATENTED APR. 18, 1905.
E. G. HERBERT.
CIRCULAR SAWING MACHINE.
APPLICATION FILED APR. 18, 1903.
3 SHEETS—SHEET 3.
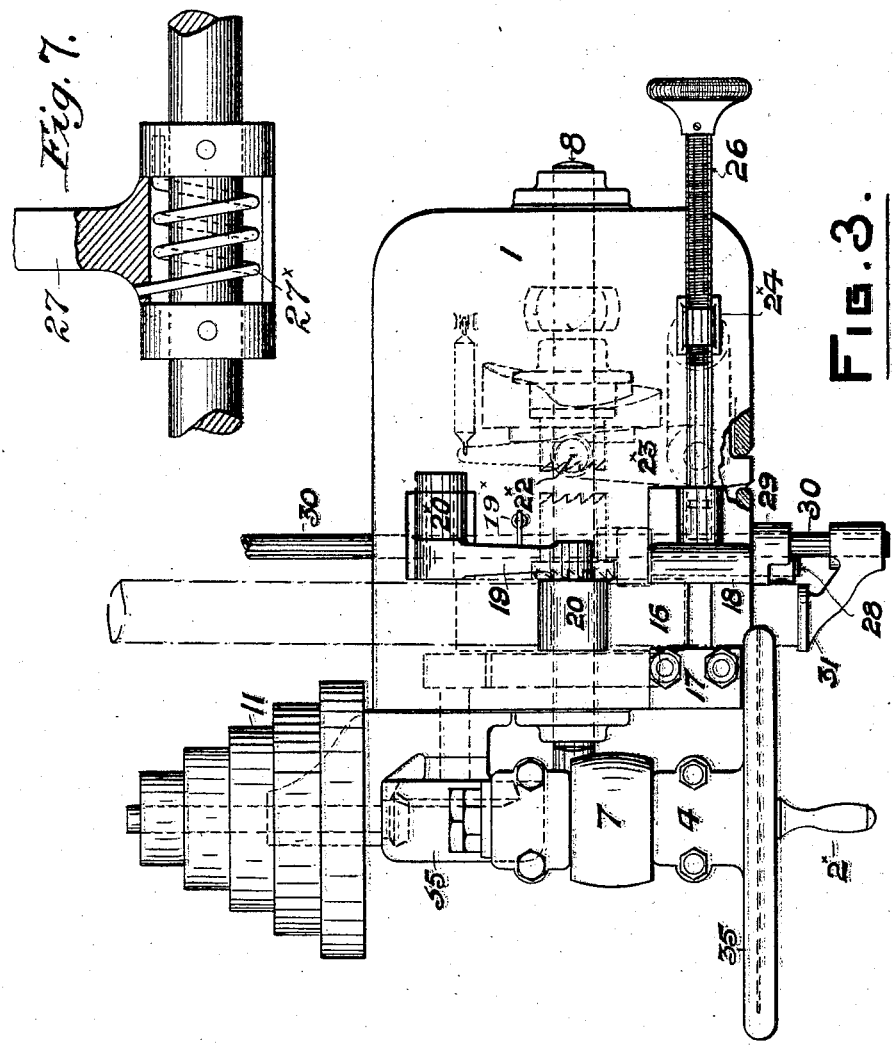
Witnesses:
William Eastwood.
John Camp.
Inventor:
Edward G. Herbert
By his Attorney: Walter Gunn No. 787,510.

Patented April 18, 1905.

UNITED STATES PATENT OFFICE.

EDWARD G. HERBERT, OF MANCHESTER, ENGLAND.

CIRCULAR SAWING MACHINE.

SPECIFICATION forming part of Letters Patent No. 787,510, dated April 18, 1905.

Application filed April 18, 1903. Serial No. 153,339.

*To all whom it may concern:*

Be it known that I, EDWARD GEISLER HERBERT, a subject of the King of Great Britain and Ireland, and a resident of Manchester, England, have invented certain new and useful Improvements in Circular Sawing Machines for Metal, of which the following is a specification.

This invention has for its object to provide a simple and reliable form of circular sawing machine, chiefly for automatically cutting up metal rods, tubes, and the like into even predetermined lengths.

A further object is to permit of the said machine being also used for cutting up odd lengths.

Upon the accompanying drawings, Figure 1 illustrates a side elevation partly broken away to show the inner working parts, and Fig. 2 an end elevation of a machine embodying the invention. Fig. 3 illustrates a plan, and Figs. 4, 5, 6, and 7 illustrate details.

The same reference-numerals represent the same parts on all the views.

1 designates the machine-base, which is of any suitable design and capable of standing on a floor.

2 is the circular saw, the axle or spindle 3 of which is mounted in the forked upper end of a lever-arm 4, (hereinafter termed the "saw-arm,") axially mounted on stud 5, carried in brackets 6 on the machine-base. The saw is driven by belt-pulley 7 and either directly, as shown, or, when reduced speed and increased power is required, through toothed gearing, which may be so arranged as to permit of the ready change from one speed to another.

In the machine-base are the bearings for a shaft 8, (hereinafter termed the "cam-shaft,") and such shaft is free to rotate and is driven through spur gear-wheels 9, bevel-wheels 10, and stepped belt-pulleys 11 or in any other suitable manner. Loose upon the said cam-shaft, but incapable of moving endwise, is a feed wheel or drum 12. Also loose upon such shaft and incapable of endwise movement is a cam 13. Between the wheel and cam and capable of moving endwise on the shaft upon a key or feather is a sleeve 14, and in the opposite ends of such sleeve, also in the boss of the wheel 12 and on the bush or end of the cam 13, are corresponding clutch-teeth 15. With the cam-shaft in motion and the sleeve by its teeth in engagement with the teeth of the wheel 12 it rotates such wheel, while when in engagement by its teeth with the teeth of the cam 13 it rotates the cam. When in a central position, it rotates neither, and both wheel and cam remain stationary; but by reason of a spring $14^\times$ in or about the sleeve it is normally held in gear with the cam.

Above the wheel 12 is the vise by which the object to be cut is held while being acted upon by the saw, and such vise comprises a floor part 16, a fixed jaw 17, and a loose jaw 18, the end of the vise being immediately adjacent to and parallel with the plane of the saw. The periphery of the wheel 12 extends through an opening in and stands slightly above the floor part 16, as shown in Fig. 1, and directly above it and carried by a lever 19 and bracket $20^\times$ is a roller 20, which upon a tube or rod being placed in the vise holds such tube or rod under the force of a spring $19^\times$ against the wheel 12 and if free when the wheel is rotated causes it to move with the wheel and in a direction at right angles with the plane of the saw. This movement, as hereinafter explained, is utilized for advancing the metal after each piece is cut off. Also in the machine-base are the bearings of another shaft, 21, (hereinafter termed the "feed-shaft,") which is parallel with the cam-shaft and is prevented by a key or other suitable means from revolving, but is free to move longitudinally. Such feed-shaft is connected to the saw-arm 4 (see Fig. 1) and by its movements (as hereinafter explained) feeds the saw against and through the object in the vise and then returns the same. The means for producing the said endwise movements consists of the cam 13 and a runner or bowl 22, carried by an arm 23, fixed on the shaft 21, the said bowl always engaging or lying against one face of the cam, as shown. When the cam-shaft is in motion and the sleeve 14 is held in play with the clutch-teeth of the cam, the cam rotates and pressing, by reason of its inclined or "cam" face, against the bowl 22 causes the feed-shaft 21 to move endwise and feed the saw against and through the metal object in the vise, the full stroke of feed being reached and the object in the vise being cut through when the thickest part of the cam presses against the bowl or when the cam has almost made a complete revolution, after which the bowl, following the contour of the cam, passes on to the narrower part of the cam and allows the saw under the pull of a spring (see Fig. 1) to return to its starting-point ready for the next cut, which is effected in the same manner. In the opposite face of the cam 13 is a depression $13^\times$, and constantly pressing against such face under the force of a spring (see Fig. 3) is a bowl $22^\times$, carried by a lever $23^\times$. This lever (hereinafter referred to as the "vise-lever") is in turn pivoted to and carried by a slide $24^\times$, resting upon but extending below the machine-top, and the shorter end of the vise-lever is in the form of a claw or tooth which takes into an opening in the side of the casing and takes a bearing in such opening. (See Fig. 3.) In the slide $24^\times$ is mounted the regulating-screw $26^\times$ of the loose vise-jaw 18. After the cam has advanced the saw through the work and the saw is retiring the bowl $22^\times$ under the pull of its spring enters the depression $13^\times$ and causes the vise-lever to move back the slide $24^\times$, and with it the loose jaw 18, thus automatically releasing the object in the vise. Upon the feed-shaft is a further arm 27, axially loose upon such shaft, but capable of moving endwise with the shaft and at one part (see Fig. 2) shaped to fit against or lie adjacent to the sleeve 14. At its free end such arm carries a rod 28, and by means of such rod and an adjustable coupling-piece 29 (see Fig. 2) it is connected to the carrier-rod 30 of a fence or gage 31, by which the lengths of metal to be cut are determined. The rod 30 is slidably and rotatably mounted in holes formed in the side walls of the machine-base. While the feed-shaft 21 is making its return movement the arm 27 meets a shoulder on the sleeve 14 and pushing against the same withdraws the sleeve from engagement with the cam and presses it into engagement with the feed-wheel 12. The work in the vise being released, as aforesaid, it is then advanced by the motion of the wheel 12 until it meets the gage 31, when, pushing against such gage, it causes the gage to move and in turn move the arm 27 out of engagement with the sleeve 14. The moment the sleeve is free from the arm 27 it returns (under the impulse of the spring) into engagement with the cam and again causes the rotation of the latter. Due to the shape of that face of the cam nearest the saw the first movement of the cam serves to move back the jaw 18 and reclamp the work. Due to the shape of the other face of the cam the subsequent motion thereof then effects the advance and retirement of the saw, when the jaw again moves back and the sleeve again engages the feed-wheel, and so on continuously until the whole length of the bar or rod is cut up. The arm 27 engages the sleeve by reason of a torsion-spring $27^\times$, (see Fig. 7,) concealed within the boss of the arm and surrounding the shaft 21, with one end engaging the shaft and the other end poking through a hole in the arm-boss.

To vary the length of metal cut off, the gage 31 is moved in or out or toward or away from the machine. At the time when the metal is fed forward the gage is directly opposite the vise; but as the feed-shaft moves forward it moves the gage clear of the work, and thus allows of the detached length of metal falling clear instead of becoming jammed between the saw and the gage, as might otherwise happen.

To prevent injury to the attendant, the saw, likewise the bevel-wheels 10, are fitted with removable shields or guards 35, as shown.

For the purpose of adapting the machine for cutting off single pieces of various lengths a handle $2^\times$ is fixed to the saw-guard, so that the saw can be fed through the work by hand, means, such as a slide-bar 32 with bracket 33, being also provided, by which the arm 27 is held clear of the sleeve 14 and the sleeve held clear of both the wheel 12 and the cam 13, so that both the wheel and cam remain stationary and the feed-shaft 21 is free to slide to and fro. The lowest position of the top roller 20 of the vise is determined by a set-screw 34, and the width of the vise is regulated by the adjustment of the screw 26.

What I claim is—

1. In a machine for automatically cutting up rods, tubes, bars and the like into even predetermined lengths, a machine-base, a work-holding vise comprising fixed and loose jaws upon said base, a circular rotating saw, means for supporting the axis of the saw and allowing the saw to move in a plane at right angles to the work in the vise, a rotary shaft in the said base and means for imparting continuous rotary motion thereto, a double-faced cam loosely mounted upon such shaft but incapable of endwise movement, a slidable feed-shaft intermediate of such cam and the said saw-carrying means for alternately advancing and returning the saw against and through the work held in the vise, and means intermediate of the said cam and vise for alternately operating the loose jaw of the vise and thereby clamping and unclamping the work to be sawed, a feed-wheel also loosely mounted upon the said cam-carrying shaft but incapable of endwise movements, and serving, when rotated, after each cut, to advance the work, clutch-teeth on such feed-wheel and clutch-teeth on the cam, a sliding clutch-sleeve and means for keying the sleeve to the cam-carrying shaft, a spring located between the clutch-sleeve and feed-wheel and serving to urge the clutch-sleeve into engagement with the cam, a gage acted upon by the work in the vise, and a clutch-shifter on the slidable feed-shaft arranged to be acted upon by the said gage to release the clutch-sleeve, substantially as set forth.

2. In a machine of the kind described, a machine-base, a rotary shaft in such base, and means for imparting continuous rotary motion thereto, a double-faced cam and a work-feed wheel loosely mounted upon such shaft but incapable of endwise movements and each having clutch-teeth, a sliding clutch-sleeve on and rotating with the said cam-carrying shaft, a spring located between the feed-wheel and clutch-sleeve to urge the clutch-sleeve into engagement with the cam, a slidable saw-feed shaft, a bracket and bowl on the said feed-shaft with the bowl engaging the cam, a clutch-shifter on the feed-shaft adapted when the saw-feed shaft is making its return movement to engage the clutch-sleeve and hold it out of engagement with the cam and then in play with the feed-wheel, a gage acted upon by the work in the vise, and means intermediate of the gage and the clutch-shifter whereby the clutch-shifter is acted upon by the gage to release the clutch-sleeve, and also whereby the gage is acted upon by the clutch-shifter to move it sidewise, substantially as set forth.

3. In a machine of the kind described, a machine-base, a shaft in such base and means for imparting continuous rotary motion thereto, a double-faced cam and a work-feed wheel each provided with clutch-teeth and each loosely mounted on the said shaft but incapable of endwise movement, a sliding clutch-sleeve on and means for keying the sleeve to the cam-carrying shaft, a spring located between the feed-wheel and clutch-sleeve to urge the clutch-sleeve into engagement with the cam, a work-holding vise with fixed jaw and loose jaw upon the said base, a regulating-screw attached to the loose jaw, a slide through which the screw passes and which is loosely supported at one part upon the machine-base and at another part lies below the machine-base, a lever with long and short arms and pivotally carried by the said slide and with the shorter arm taking its fulcrum on the machine-base, a loose bowl upon said lever and a spring for acting on the lever and holding the bowl against the cam, substantially as set forth.

4. In a machine of the kind described, a machine-base, a shaft in such base and means for imparting continuous rotary motion thereto, a double-faced cam and a work-feed wheel each provided with clutch-teeth and each loosely mounted on the said shaft but incapable of endwise movement, a sliding clutch-sleeve on and means for keying the sleeve to the cam-carrying shaft, a spring located between the feed-wheel and clutch-sleeve to urge the clutch-sleeve into engagement with the cam, a circular rotating saw, means for supporting the axis of the saw, and allowing the saw to move in a plane parallel with the said cam-carrying shaft, a slidable feed-shaft connected to the said cam-carrying means, a bracket and bowl on the feed-shaft with the bowl engaging the cam, a gage arranged to be acted upon by the work, and a clutch-shifter on the feed-shaft arranged to be acted upon by the gage to release the clutch-sleeve, substantially as set forth.

In witness whereof I have hereunto set my hand in the presence of two witnesses.

EDWARD G. HERBERT.

Witnesses:
 WILLIAM EASTWOOD,
 JOHN CAMP.